United States Patent [19]

Helm et al.

[11] 4,157,164
[45] Jun. 5, 1979

[54] FORAGE HANDLER

[76] Inventors: Arnold E. Helm; Lennis D. Helm, both of R.R. 1, Linn, Kans. 66953

[21] Appl. No.: 872,757

[22] Filed: Jan. 27, 1978

[51] Int. Cl.$^2$ .................. B02C 18/22; E21C 35/00
[52] U.S. Cl. ........................... 241/101.7; 198/513; 198/518; 241/152 A; 241/283
[58] Field of Search ............... 241/101.7, 283, 277, 241/152 A, 154; 198/511, 513, 518, 519

[56] References Cited

U.S. PATENT DOCUMENTS

| | | | |
|---|---|---|---|
| 1,143,897 | 6/1915 | Flexner et al. | 198/511 X |
| 2,762,141 | 9/1956 | LeTourneau | 198/518 X |
| 2,836,023 | 5/1958 | Caldwell | 247/101.7 X |
| 2,862,598 | 12/1958 | Oswalt | 198/519 |
| 3,741,051 | 6/1973 | Brooks et al. | 241/101.7 X |
| 3,779,408 | 12/1973 | Ivie | 241/101.7 X |
| 3,847,266 | 11/1974 | Cox | 198/518 X |
| 3,892,443 | 7/1975 | Arentzen | 198/513 X |
| 3,916,605 | 11/1975 | Richards et al. | 241/101.7 X |
| 3,985,305 | 10/1976 | Williamson et al. | 241/101.7 X |

Primary Examiner—Gary L. Smith
Assistant Examiner—Robert P. Olszewski
Attorney, Agent, or Firm—Fishburn, Gold & Litman

[57] ABSTRACT

A forage handler adapted for mounting on a standard forage gathering device comprises a rotary head having protruding tines for dislodging forage from stacks and urging it toward the forage gathering device. The handler includes a support frame in which the rotary head is mounted, and a rotary beater or separator having teeth for breaking up large aggregations of forage and urging the same toward the forage gathering device. The support frame has a pair of booms which are pivotally connected to the gathering device and include motors to swing the rotary head into selected vertical orientations for dislodging the forage. The beater is positioned substantially parallel with and rearward of the rotary head, whereby the forage dislodged from the stacks by the rotary head is directed into the beater for flailing the forage to break up the large aggregations thereof, and urge the forage toward the gathering device.

7 Claims, 8 Drawing Figures

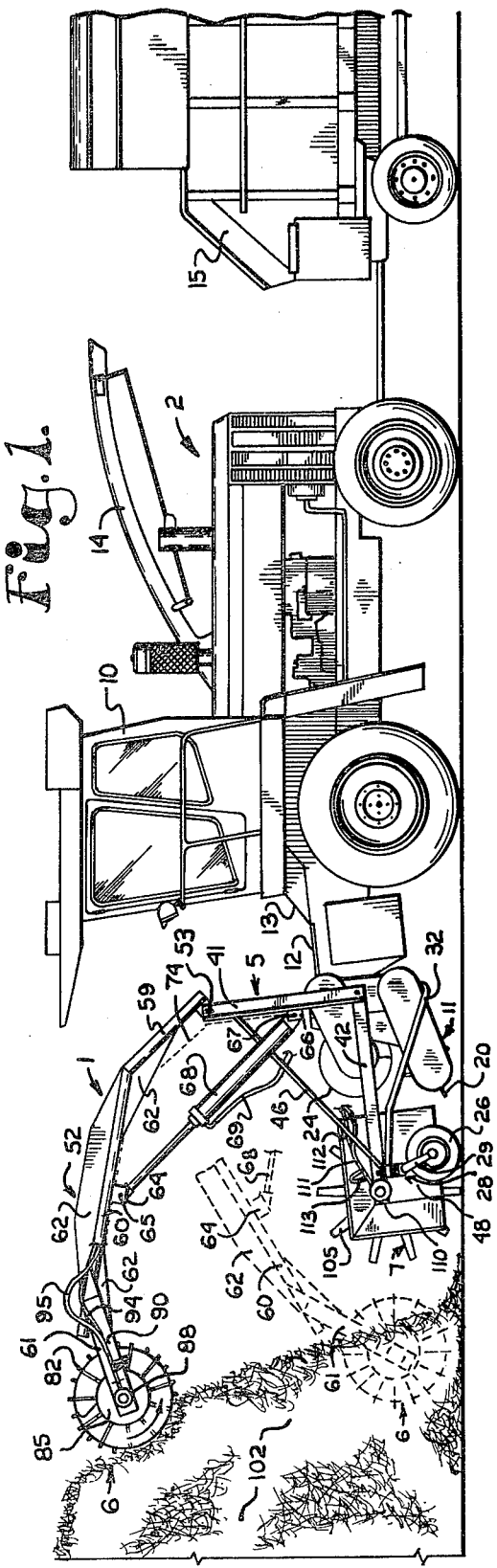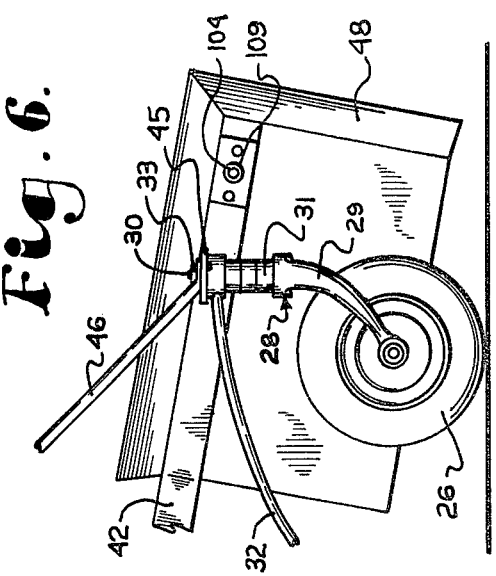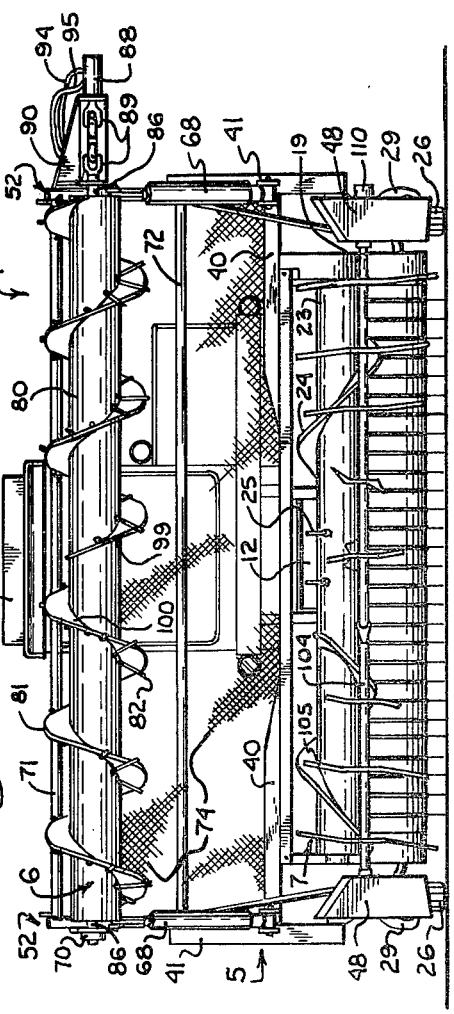

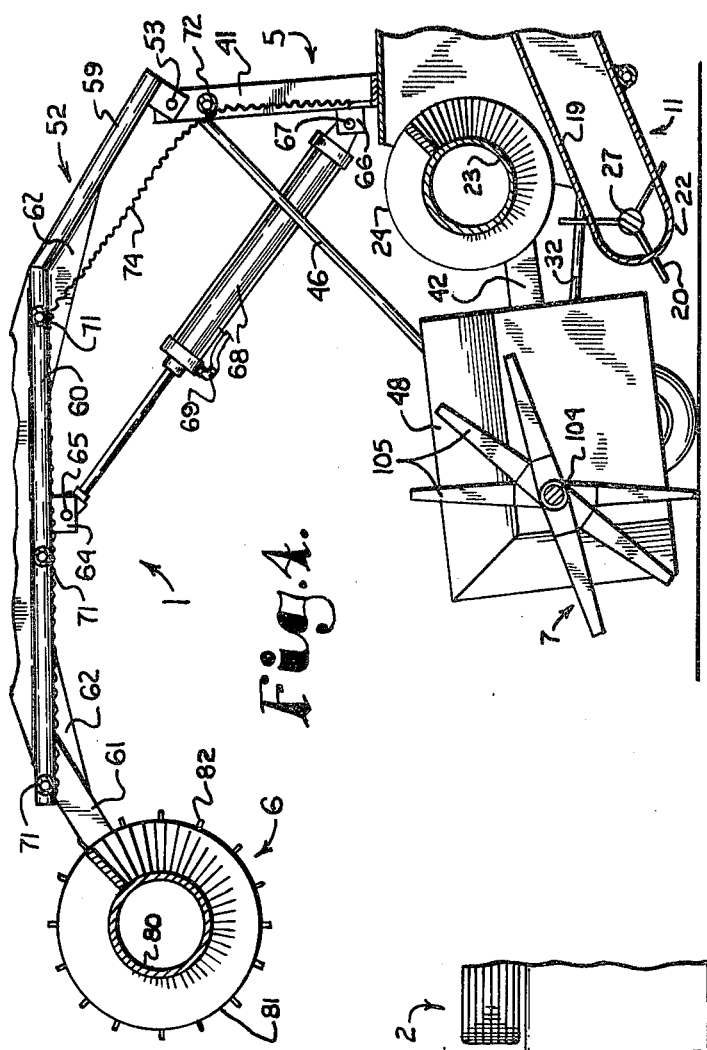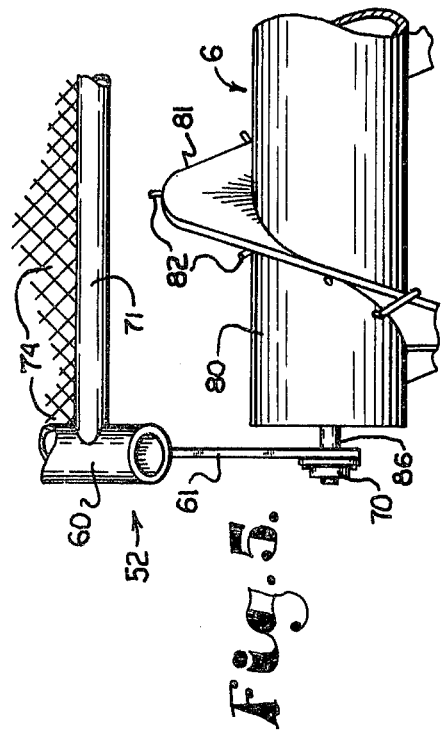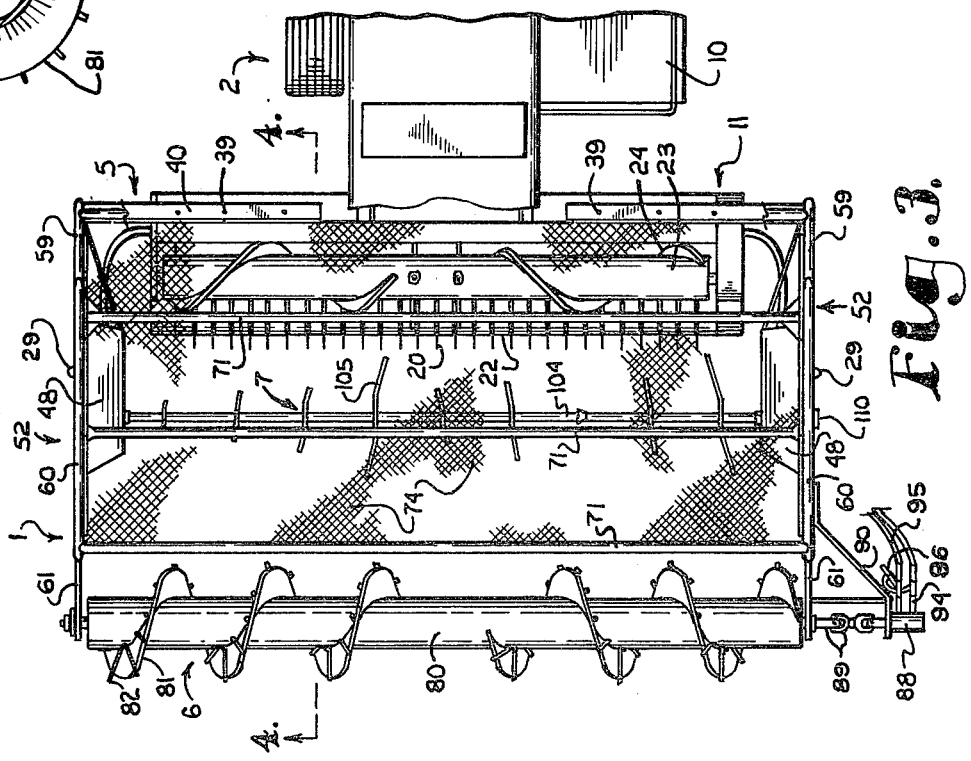

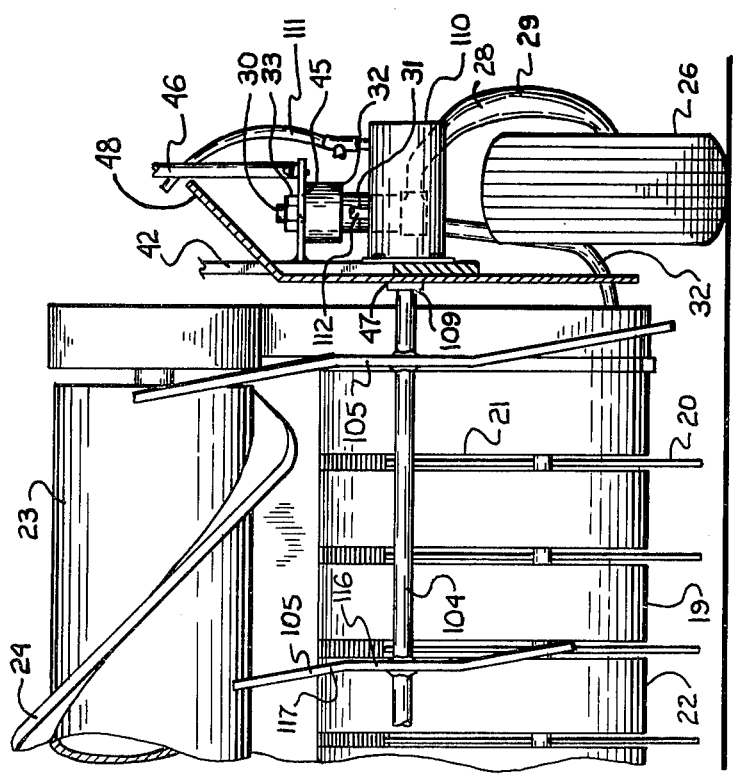

FORAGE HANDLER

BACKGROUND OF THE INVENTION

This invention relates to a forage handler and more particularly to a forage handler having a rotary head and beater for retrieving forage from large forage stacks.

Modern agricultural techniques teach the storage of loose hay, corn silage, milo silage, and other types of forage in stacks either on top of the ground or in specifically constructed trenches partially or entirely positioned below ground level. Additionally, large round bales of hay weighing on the order of 1500 pounds are also often stored in rows on the open uncovered ground. Both the stacks and the bales cure on their outer surface and thus protect the interior forage from spoilage and weathering.

Equipment for handling forage stored in this outside stack manner is required to pick up the forage from the stacks and transport it from the fields in which it is stored to the various areas in which the livestock are fed and tended. As the stacks cure, very hard blocks or aggregations of forage are often formed as a result of the moisture, heat and pressure developed in the stacks as the forage decomposes. The extent of the formation of such aggregations varies in accordance with the dryness of the crops, type of crop, weather conditions, and the like. However, under typical farming conditions, these forage aggregations are formed and can create substantial problems in handling the stacked forage. Also, because the stacks are relatively high, it is difficult to easily access and load the forage without causing the stack to cave in and clog the loading or handling device.

The principal objects of the present invention are: to provide a forage handler having a vertically adjustable rotating head for dislodging forage from outside forage stacks; to provide such a forage handler having a rotary beater which breaks up large aggregations of forage and assists in feeding the forage into the forage gathering equipment; to provide such a forage handler adapted for combination with conventionally designed agricultural forage gathering devices which can further chop and/or process the forage if so desired; to provide such a forage handler which is easily removable from the forage gathering equipment during seasons when not in use or alternatively, which can be left mounted on the forage gathering equipment even when it is used for its normal task of harvesting forage without interfering therewith; to provide such a forage handler wherein the rotor head dislodges forage from the stack and directs the same into the rotary beater; to provide such a device having the rotary head mounted between the ends of a pair of support booms and including a wire mesh cover positioned therebetween for directing the dislodged forage into the beater; and to provide such a forage handler which is capable of an extended useful life, and is particularly well adapted for the proposed use.

Other objects and advantages of this invention will become apparent from the following description taken in connection with the accompanying drawings wherein are set forth by way of illustration and example, certain embodiments of this invention.

The drawings constitute a part of this specification and include exemplary embodiments of the present invention and illustrate various objects and features thereof.

FIG. 1 is a side elevational view of a forage handler embodying the present invention, being shown attached to a forage gathering device, and wherein the forage handler has a lowered position as illustrated in phantom lines.

FIG. 2 is a front elevational view of the forage handler and the forage gathering device with the rotary head in a raised position.

FIG. 3 is a top plan view of the forage handler.

FIG. 4 is a vertical cross-sectional side view of the forage handler with the rotary head in the raised position, and taken along line 4—4, FIG. 3.

FIG. 5 is an enlarged, fragmentary front elevational view of the rotary head.

FIG. 6 is an enlarged, fragmentary side elevational view of a wheel assembly and a rotary beater mounting on the right side of the forage handler.

FIG. 7 is an enlarged, fragmentary front elevational view of an interconnection between the forage handler and a support wheel for the forage gathering device.

FIG. 8 is a fragmentary rear elevational view of the forage handler and interconnection of same with the forage handling device.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a respresentative basis for teaching one skilled in the art to variously employ the present invention in virtually any appropriately detailed structure.

Referring more in detail to the drawings:

In the disclosed embodiment of the present invention, the reference numeral 1 generally designates a forage handler embodying the present invention, and adapted for use in combination with forage gathering or device 2. The forage handler includes a frame 5, a rotary head 6, and a rotary separator or beater 7.

The forage gathering device 2 is suitable for picking up hay, silage, and other forage from the ground and conveying the same to a desired location, such as into a transporting wagon. The forage gathering device 2 preferably has a conventional design, and may be either self-propelled, or of the pull type. In situations where it is desired to further cut or chop the forage, the forage gathering device 2 may also include a forage chopper, cutter, or other device to further process the forage. In the illustrated embodiment, the forage gathering device 2 comprises a conventional self-propelled forage harvester 10, a mating windrow pickup head 11, a forage chopper 12, a chopped forage blower 13, a chopped forage conveyor 14, and a trailing wagon 15. The forage harvester 10 has a self contained hydraulic system (not shown) to provide hydraulic oil pressure to the various required locations on the forage handler 1, as will be discussed hereinafter. The pickup head 11, as best seen in FIGS. 2 and 4, includes a frame 19 and a plurality of tines 20 radially extending from a shaft 27. The tines 20 rotate within openings 21 (FIG. 8) in a housing 22 attached to the frame 19, and pickup forage from the ground and deposit it on the housing 22. An auger 23 is mounted in the device and has helically disposed flighting 24 and radially extending feeder bars 25. The auger 23 centrally urges forage deposited on the housing 22 into the forage chopper 12. A pair of height adjustment wheels 26 are connected on opposing sides of the pickup head frame 19 by wheel mounts 28. Each wheel mount 28, as best seen in FIGS. 6 and 7, includes a C-shaped bar 29 to which the wheel 26 is rotatably attached and an upwardly extending threaded shaft 30. A plurality of removable spacer disks 31 for adjusting height of the pickup head 11 are disposed on the shaft 30, and a second bar 32 has one end fixedly attached to the pickup head frame 19 and a second end mounted on the shaft 30 above the spacer disks 31 and is held in position by a nut 33 which is affixed to the end of the threaded shaft 30.

For purposes of description the comparative location of the rotary head 6 is considered to be on the front side of the forage handler 1 and the forage gathering device 2. The forage gathering device 2 is normally considered to move or traverse over the land in a forward direction, and the right side of the forage handler 1 is considered to be in relation to an operator who is positioned inside the harvester 10 and who is facing forward or toward the forage handler 1.

In the forage handler 1, the frame 5 may be comprised of one pair of support and mounting means for the rotary head 6 and another independent pair of same for the rotary separator 7. In addition, the frame 5 may require minor modifications for adaptation to various types of forage gathering equipment 2. However, in the illustrated embodiment best seen in FIGS. 1 and 8, the frame 5 is one contiguous unit. Two horizontally disposed rigid angle beams 40 are attached by easily removable bolts 39 to the top of the pickup head frame 19 and extend laterally of the pickup head 11. A pair of upstanding metallic standards 41 are fixedly attached by welding or other suitable means to a distal end of the horizontal beams 40 at a point medially located along the length of each standard 41. A support arm 42 extends forwardly from and is attached to the bottom of each of the standards 41. The support arms 42 are laterally spaced and positioned along the sides of and forward of the pickup head 11. Medially located along and attached to each support arm 42 is a rigid tab 45, as best seen in FIG. 7, having an opening centrally in the tab 45 (not shown). The tab 45 is attached to the wheel shaft 30 underneath the nut 33 and interconnected therewith. The support arms 42 are thereby supported by the wheels 26 and the wheel mounts 28. A bracing rod 46 extends between the wheel mount 28 and an upper portion of each standard 41. One end of the bracing rod 46 is attached to the tab 45, and the opposite end is attached to the upper portion of each standard 41 by a bolt or other suitable means. A frontward portion of each support arm 42 extends forwardly of the pickup head wheels 26. Near the front end of each of the support arms 42 is attached a journal bearing 47 for supporting the rotary separator or beater 7 which will be described in detail hereinafter. Also attached to the front portion of each support arm 42 is a forage directing shield 48. The shields 48 are rectangular in shape and have portions along the front and top edges which extend outwardly at angles from the main portion of the shields 48. The shields 48 guide forage toward the forage separator 7 and the pickup head 11.

At the upper portion of the frame 5, a support boom 52 (FIG. 4) extends radially from the top of each of the standards 41. The booms are pivotally mounted at one end by journal pins 53 to the tops of the standards 41. The booms 52 are laterally spaced and normally extend forwardly of the forage gathering device 2. Each boom 52 has three sections 59, 60, and 61, the first two of which have a generally tubular shape. The first section 59 is pivotally attached to standard 41 at its rearmost portion. The second section 60 extends downwardly at an angle in the nature of 40° from the first section 59 when the same is positioned horizontally. The third section 61 also extends downwardly from the front end of the second section 60 at an angle in the nature of 40° when section 60 is positioned horizontally. Each boom 52 thus forms a roughly arcuate shape which assists in positioning the rotary head as will be discussed later. The boom sections 59 and 60 are constructed of rigid tubular pipe and are made as light weight as possible to avoid upsetting the harvester 10 due to the extremely long lever-arm developed by the booms 52. Flat-iron reinforcing plates 62 are welded to the booms 52 where necessary to maintain structural integrity. Medially attached along the length of each middle boom section 60 is a U-shaped bracket 64 having openings to receive a journal pin 65. A second U-shaped bracket 66 similar to the bracket 64, is attached medially along each standard 41 and also has openings to receive a journal pin 67. A linear hydraulic motor or ram 68 has opposing ends thereof pivotally attached to the associated standard 41 boom 52 by means of the journal pins 65 and 67 respectively. Linear positioning of the rams is controlled by the standard hydraulic oil system of the forage harvester 10, through hydraulic oil lines 69. Equal oil pressure is maintained in each of the oil lines 69 thereby extending each of the rams 68 an equal distance, thus poivotally swinging the booms 52 in unison such that the booms are always positioned substantially parallel to each other.

Three transverse cross-member braces 71 are spaced along and disposed between the booms 52. Opposite ends of the cross-member braces 71 are fixedly attached to the booms 52 such that the cross-member braces 71 extend between the booms 52 and provide structural strength to the same. Another transverse cross-member brace 72 is similarly attached near the top of the standards 41 and extends between the same. A wire mesh cover 74 or other suitable netting is fastened to and extends between the booms 52 and the standards 41. The web 74 is supported by the cross-member braces 71 and 72 on the interior side thereof, and has a mesh size sufficiently small to catch forage thrown or blown against it and direct the same toward the rotary beater 7 and the pickup head 11.

The rotary head 6 is rotatably mounted and transversely extending between the booms 52, and is normally oriented horizontally along its longitudinal axis with respect to the ground. The rotary head 6 is shaped similar to an auger and includes a main shaft or drum 80, flighting 81 and tines 82. The main shaft 80 is a cylindrically shaped rigid tube and has caps 85 welded to each end thereof. Journal members 86, as best seen in FIG. 5, are suitably fastened as by welding to each cap 85 and extend outwardly from and are coaxially aligned with the main shaft 80. The journal members 86 are positioned in the journal bearings 70 located on the frontward end of the booms 52. A hydraulic motor 88 is connected to the end of the journal member 85 on the left side of the handler by a flexible double U-joint 89. The motor 88 is fixedly attached to the third section 61 of the left boom 52 by a mounting bracket 90. The motor 88 rotates the head with respect to the frame and may be powered by electricity, compressed air, or the like, and in the illustrated structure is operated by the hydraulic oil system for the harvester 10. Hydraulic oil line 94 supplies oil to the motor under pressure and hydraulic oil line 95 conveys the oil back to the harvester 10 after use by the motor 88. A relief valve 96 on the hydraulic oil line 94 releases excess oil pressure therefrom into the return hydraulic oil line 94. The high pressure setting on the relief valve 96 determines a maximum speed at which the motor 88 will turn as the speed is proportional to the differential oil pressure across the motor 88. Thus the hydraulic oil operates the motor 88 which in turn rotates the rotary head 6. The double U-joint 89 positioned between the motor 88 and the journal member 86 allows some translational movement of the shaft, which movement may be resultant from one side of the rotary head 6 encountering a large mass of forage which acts to slightly rotate the rotary head about its longitudinal center and which also allows for other similar slight misalignment of the shaft 80, the journal members 86 and the motor 88.

As best illustrated in FIG. 2, the flighting 81 on the rotary head 6 comprises two spirally shaped vanes 99 and 100, which originate near the longitudinal center of the main shaft 80 and are welded thereto. Each of the spiral vanes 99 and 100 form a helix about the main shaft 80. The helix formed is of constant helical angle. However, the helixes are generated in opposite directions around the main shaft 80 from the center of the same, whereby when the rotary head 6 is rotated counterclockwise when viewed from the left side, so as to direct the forage downwardly. The flighting 81 urges the forage toward the longitudinal center of the shaft 80. The construction of the flighting 81 is preferably thick gage rigid webbing. Spaced along the flighting 81 and radially extending from the main shaft 80 are the tines 82. The tines 82 are sections of rigid rod and are fixedly attached by means such as welding at their base to the main shaft 80, and are further attached to the flighting 81 at some medial position or along their entire length. The tines 82 extend outwardly beyond the flighting 81 a distance sufficient to engage and dislodge the forage from a forage stack 102, but not so great a distance as to be easily bent. The optimum distance of the tines 82 beyond the flighting 81 is in the nature of one inch.

The rotary separator or beater 7 as best seen in FIGS. 2, 4 and 6 includes a shaft 104 having a plurality of teeth or blades 105 radially extending therefrom. Attached to the ends of the beater shaft 104 are coaxial journal members 109 of somewhat smaller diameter than the shaft 104. The journal members 109 are mounted in and rotate in the journal bearings 47 on the support arms 42. Connected to the left journal member 47 by a conventional method is a hydraulic motor 110 which is also fixedly attached to the left support arm 42. Hydraulic oil pressure is supplied to the motor 110 from the hydraulic oil system of the harvester 10. Hydraulic oil is fed to the motor by line 111 and is conveyed back to the harvester 10 after use by the motor 110 by line 112. A relief valve 113 bypasses oil around the motor 110 in situations of overpressure. The release setting on the relief valve 113 determines the maximum rotational speed of the motor 110. Thus the shaft 104 of the rotary separator 7 is positioned between the support arm 42 and is rotated by the hydraulic motor 110 on the journal bearings 47.

As best seen in FIGS. 4 and 7, the teeth 105 are spaced along and welded to the shaft 104 at regular intervals. Each tooth 105 has the shape of an elongated spear extending outwardly and diametrically from both sides of the shaft 104, has a truncated distal end, and includes two portions 116 and 117. The first tooth portion 116 extends perpendicularly from the shaft 104 to a medial distance along the length of the tooth 105 wherefrom the second blade portion 117 extends at an obtuse angle to blade portion 116, whereby each blade 105 is bent at a medial distance along the length thereof. The bending of each blade 105 provides a more continuous swath through aggregations of forage thereby breaking up greater amounts of such forage. The teeth 105 are arranged in a helical pattern or configuration on the shaft 104 which pattern is generated outwardly from the longitudinal center of the shaft 104. The helical pattern is used to produce more uniform engagement of forage at equally spaced distance along the shaft 104 and thus provides better balancing along same. The helical pattern also urges forage toward the center of the pickup head 11 for improved feeding of the forage chopper 12.

The rotary beater 7 is fixed in position relative to the pickup head 11. Normally the rotary separator 7 is in close proximity to the ground being traversed by the forage gathering device 2, that is, the distal ends of the blades 105 rotate within the nature of several inches from the ground. When the handler is used in areas where the ground contour is very irregular, the height of the rotary head separator 7 may be adjusted to match the roughness of the ground conditions. Adjustment of the height of the rotary beater 7 is accomplished by raising or lowering the pickup head which in turn is done by addition to or reduction in the number of spacer disks 31 on the pickup head wheel mounts 28.

In use, the farmer-operator positions the forage gathering device 2 in front of a forage stack 102, with the forage handler 1 in close proximity to the forage. The rotary head 6 is swung through various vertical positions by adjusting the oil pressure on the rams 68 until the same engages the top of the forage stack 102. The arcuate shape of the booms 52 allows easier positioning of the rotary head 6. The rotary head motor 88 is activated and rotates the rotary head 6 in the nature of 500 revolutions per minute. The tines 82 on the rotary head 6 dislodge forage from the forage stack 102 which forage is consequently urged centrally by the flighting 81 on the rotary head 6. The rotary head 6 is normally positioned above and forward of the rotary beater 7 whereby the dislodged forage falls in front of the rotary beater 7. The rotary head 6 rotates inwardly toward the forage gathering device whereby forage is directed toward the rotary beater 7. As used herewithin "rotating inwardly" is understood to mean that the rotary head 6 rotates counterclockwise as seen in FIG. 4 or as seen by one standing to the left of and looking at the forage handler 1. The rotary beater 7 is rotated by the motor 110 in the nature of 500 revolutions per minute. The beater teeth 105 engage and flail the forage which is directed thereto by the rotary head 6 to break up large aggregations of forage and direct the same toward the forage gathering device. The wire mesh cover 74 is shaped such that the forage dislodged by the rotary head 6 is directed off of the cover into the beater 7. The distal ends of blades or teeth 105 of the rotary beater or separator 7 pass in close proximity to the earth being traversed by the forage handler 1 and thereby urge the forage toward the pickup head 11. The forage is deposited on the housing 22 where it is urged toward the forage chopper 12 by the auger 23. The forage chopper 12 cuts or chops forage which is then transported by a blower 13 through a conveyor 14 to a trailing wagon 15 for later dispersal to livestock or other disposition.

It is to be understood that while I have illustrated and described a certain embodiment of my invention, it is not to be limited to the specific forms or arrangement of parts herein described and shown.

We claim:

1. A mobile handler for retrieving and processing stacked, unchopped forage, and adapted for attachment to a mobile forage gathering device, said handler comprising:
   (a) a rotary head having a plurality of rigid, blunt tines protruding radially thereof for dislodging unchopped forage from stacks thereof;
   (b) a first support frame having said rotary head rotatably mounted in a first end thereof; said first support frame having a second end thereof shaped for pivotally connecting said frame with said forage gathering device, whereby said rotary head is positioned substantially transverse to and forward of said forage gathering device;
   (c) first motor means operably connected with and rotating said rotary head;
   (d) second motor means operably connected with and selectively pivoting said first support means with respect to said forage gathering device, and selectively swinging said rotary head into a plurality of vertical positions;
   (e) a rotary beater having a plurality of rigid, blunt teeth projecting radially thereof for breaking up large aggregations of the unchopped forage which are dislodged from the stack by the rotary head;
   (f) a second support frame having said rotary beater rotatably mounted in a first end thereof; said second support frame having a second end thereof shaped for connection with said forage gathering device, whereby said rotary beater is disposed substantially transverse and forward of said forage gathering device, and said rotary beater is normally disposed below and rearward of said rotary head; and
   (g) third motor means operably connected with and rotating said rotary beater; and
   (h) cutter means for chopping up the forage; said cutter means including rotary pick up tines which pick up separated, unchopped forage from the ground and convey the same to a chopper portion of said cutter means; said cutter means being connected with said forage gathering device, and positioned directly rearwardly and in-line with said rotary beater, whereby unchopped forage is in sequence, dislodged from the stacks by said rotary head; directed under gravitational forces into said rotary beater for flailing the unchopped forage to break up the large aggregations thereof and urge the separated forage into the cutter; picked up from the ground by said rotary tines; and cut into small segments by the chopper portion of the cutter means for transportation into the forage gathering device.

2. A forage handler according to claim 1 wherein:
   (a) said rotary beater has a shaft disposed transverse to forward motion of said forage handler; and
   (b) said teeth are fixedly attached to and radially extending from said shaft, and are disposed in a regular configuration thereabout, whereby a distal end of each of said teeth is disposed to pass in substantially close proximity to the surface of earth being traversed by said forage handler for flailing the forage.

3. A forage handler according to claim 2 wherein:
   (a) said beater teeth are disposed in a helical pattern about said shaft, are bent transversely at a medial portion thereof, and present a continuous swath for evenly and thoroughly breaking up said aggregations of forage.

4. A forage handler according to claim 3 wherein:
   (a) said beater teeth pattern is generated outwardly from the longitudinal center of the shaft; and
   (b) said rotary beater is adapted for positioning in close proximity to said forage gathering device and assists in feeding said forage thereto.

5. A forage handler according to claim 1 wherein:
   (a) said rotary head has a shaft disposed normally transverse to forward motion of said forage handler and includes flighting fixedly attached to said shaft; said flighting being disposed in a substantially helical configuration and generated from a longitudinal center of said shaft in opposite directions, whereby forage is urged toward said longitudinal center of said shaft upon rotation of said rotary head.

6. A forage handler according to claim 5 wherein:
   (a) said tines are attached to and radially extend from said shaft, are fixedly attached to said flighting, and extend substantially beyond said flighting.

7. A forage handler according to claim 1 wherein:
   (a) said first support frame comprises a pair of laterally spaced booms having said rotary head rotatably mounted thereinbetween; said booms being adapted for positioning on opposing sides of said forage gathering device and connection therewith; and
   (b) a wire mesh cover extends between said booms; and
   (c) said rotary head rotates inwardly toward said forage gathering device, whereby unchopped forage dislodged by the rotary head is directed by said wire mesh cover into said rotary beater.

* * * * *

UNITED STATES PATENT OFFICE
CERTIFICATE OF CORRECTION

Patent No. 4,157,164　　　　　　　　　Dated June 5, 1979

Inventor(s) Arnold E. Helm; Lennis D. Helm

It is certified that error appears in the above-identified patent and that said Letters Patent are hereby corrected as shown below:

Inventors:　Arnold E. Helm; Lennis D. Helm,
　　　　　　both of R. R. 1, Linn, Kans. 66953

Should Read:

Inventors:　Arnold E. Helms; Lennis D. Helms,
　　　　　　both of R. R. 1, Linn, Kans. 66953

Signed and Sealed this

Sixteenth Day of October 1979

[SEAL]

Attest:

RUTH C. MASON
Attesting Officer

LUTRELLE F. PARKER
Acting Commissioner of Patents and Trademarks